(12) United States Patent
Hemingway

(10) Patent No.: US 8,317,221 B2
(45) Date of Patent: Nov. 27, 2012

(54) INTEGRATED SIDE CURTAIN AIRBAG ASSEMBLY

(75) Inventor: Todd Lawrence Hemingway, Metamora, MI (US)

(73) Assignee: A. Raymond et Cie, Grenoble (FR)

( * ) Notice: Subject to any disclaimer, the term of this patent is extended or adjusted under 35 U.S.C. 154(b) by 93 days.

(21) Appl. No.: 12/283,199

(22) Filed: Sep. 10, 2008

(65) Prior Publication Data
US 2009/0127834 A1 May 21, 2009

Related U.S. Application Data

(60) Provisional application No. 60/993,119, filed on Sep. 10, 2007.

(51) Int. Cl.
*B60R 21/213* (2011.01)
(52) U.S. Cl. .................. 280/728.2; 280/730.2
(58) Field of Classification Search ............. 280/728.2, 280/730.2, 730.1; 296/214
See application file for complete search history.

(56) References Cited

U.S. PATENT DOCUMENTS

| | | | | |
|---|---|---|---|---|
| 4,893,867 A * | 1/1990 | Hilborn et al. | ............. | 296/214 |
| 6,106,007 A | 8/2000 | Kretschmer et al. | | |
| 6,120,091 A * | 9/2000 | Reich et al. | ............. | 296/214 |
| 6,257,616 B1 | 7/2001 | Nowak et al. | | |
| 6,457,768 B1 * | 10/2002 | Schroeder et al. | ............. | 296/214 |
| 6,733,034 B2 | 5/2004 | Tiesler | | |
| 6,733,035 B2 | 5/2004 | Thomas et al. | | |
| 7,044,500 B2 | 5/2006 | Kalandek et al. | | |
| 7,172,209 B2 | 2/2007 | Totani et al. | | |
| 7,243,988 B2 | 7/2007 | Wieschermann et al. | | |
| 7,246,817 B2 | 7/2007 | Tanase | | |
| 7,658,401 B2 * | 2/2010 | Valdez et al. | ............. | 280/730.2 |
| 2002/0190506 A1 * | 12/2002 | Tiesler | ............. | 280/730.1 |
| 2004/0007857 A1 * | 1/2004 | Sonnenberg et al. | ....... | 280/730.2 |
| 2004/0012173 A1 * | 1/2004 | Blake et al. | ............. | 280/730.2 |
| 2006/0197316 A1 | 9/2006 | Watanabe | | |
| 2007/0296185 A1 * | 12/2007 | Hidaka et al. | ............. | 280/728.2 |
| 2008/0179865 A1 * | 7/2008 | Valdez et al. | ............. | 280/730.2 |
| 2010/0096842 A1 * | 4/2010 | Valdez et al. | ............. | 280/730.1 |

FOREIGN PATENT DOCUMENTS
EP 1 870 300 12/2007
JP 2004 359044 12/2004

OTHER PUBLICATIONS

Int'l Search Report, Dec. 1, 2008, Tinnerman Palnut Engineer
International Search Report and Written Opinion, Tinnerman Palnut Engineered Products, Dec. 1, 2008.
International Preliminary Report on Patentability, Tinnerman Palnut Engineered Products, Mar. 25, 2010.
Supplementary European Search Report, Tinnerman Palnut Engineered Products, Dec. 27, 2010.

* cited by examiner

*Primary Examiner* — Drew Brown
(74) *Attorney, Agent, or Firm* — McDonald Hopkins LLC

(57) ABSTRACT

An integrated airbag assembly is disclosed. The assembly includes a support structure that provides a single, unitary component that is securable to the airbag and other components, such as grab handles and coat hooks. The airbag, the grab handles and the coat hooks secure to the support structure, such as by snap-fitting to the support structure. The assembly including the airbag, the grab handle and/or the coat hook is mountable to the vehicle, such as by snap-fitting the assembly to a roof rail of the vehicle. Accordingly, the assembly improves installation of the airbag and other components to the vehicle.

19 Claims, 4 Drawing Sheets

INTEGRATED SIDE CURTAIN AIRBAG ASSEMBLY

CROSS-REFERENCE TO RELATED APPLICATIONS

This application claims priority from U.S. Provisional Application Ser. No. 60/993,119, entitled "Integrated Side Curtain Airbag Assembly" and filed on Sep. 10, 2007, which is hereby incorporated in its entirety by reference.

FIELD OF THE INVENTION

The present invention relates generally to an airbag assembly, and more particularly to an integrated side curtain airbag assembly.

BACKGROUND OF THE INVENTION

The development and improvement of side impact protection, including side curtain airbags, has been of continuing priority in the automotive industry. Side curtain airbags are often mounted adjacent the vehicle's roof rail, doorframe, structural pillars, occupant seating, or in some instances within the side door. These side curtain airbags are designed to inflate and be deployed to prevent impact of an occupant with hard or dangerous objects within the vehicle, such as windows, door handles, and the like. The side curtain air bag is typically inflated along the side window or the side door to provide cushioning restraint of an occupant's head and/or torso during a side impact or extended rollover collision. The side curtain air bags aid in the protection of the occupant during an accident or a collision.

However, presently known side impact airbag systems are difficult to install during vehicle manufacture. Specifically, current air bag systems are bulky and require numerous operators to correctly install the side air bag system directly to the side frame of the vehicle. While installing the side air bag, other operators are simultaneously required to install grab handles, coat hooks, beauty panels and other features commonly attached directly to the side frame of a vehicle. As a result, installation typically includes overhead assembly within the vehicle of numerous operators working simultaneously, which may result in operator injury, increased error rates, reduced quality and lower productivity.

Today, most vehicles are manufactured on an assembly line. Requiring the installation of numerous parts within the same location of the vehicle increases manufacturing time and costs. Accordingly, there is a need in the art to reduce the number of components required to install during vehicle manufacture.

Furthermore, current air bag systems frequently interfere with and compete for interior space with grab handles, coat hooks, overhead lighting, entertainment systems, headliners, and the like, thereby adding further complexity to vehicle design and manufacture. Also, even while close in proximity within the vehicle, the installation of grab handles, coat hooks, interior trim, and side curtain airbags involves numerous fasteners resulting in additional manufacturing costs.

Consequently, there exists a significant need for a side curtain airbag assembly that is integral with many of the surrounding systems and components, which may also be easily installed during vehicle manufacture.

DESCRIPTION OF THE DRAWINGS

Objects and advantages together with the operation of the invention may be better understood by reference to the following detailed description taken in connection with the following illustrations, wherein like numerals indicate like elements throughout, and wherein.

SUMMARY OF THE INVENTION

An airbag assembly for a vehicle is disclosed. The airbag assembly may have a support structure consisting of a single, unitary body. The support structure may secure to a grab handle and/or a coat hook. The support structure provides a single component having the airbag, the coat hook, and/or the grab handle mounted thereto. The support structure having these components is mountable to a roof rail or other portion of a vehicle to simplify installation of the assembly into the vehicle.

DETAILED DESCRIPTION

While the present integrated side curtain airbag assembly is described with reference to the preferred embodiment described herein, it should be clear that the present invention should not be limited to such an embodiment. Therefore, the description of the embodiment provided herein is illustrative of the present invention and should not limit the scope of the invention as claimed.

Figure 1:
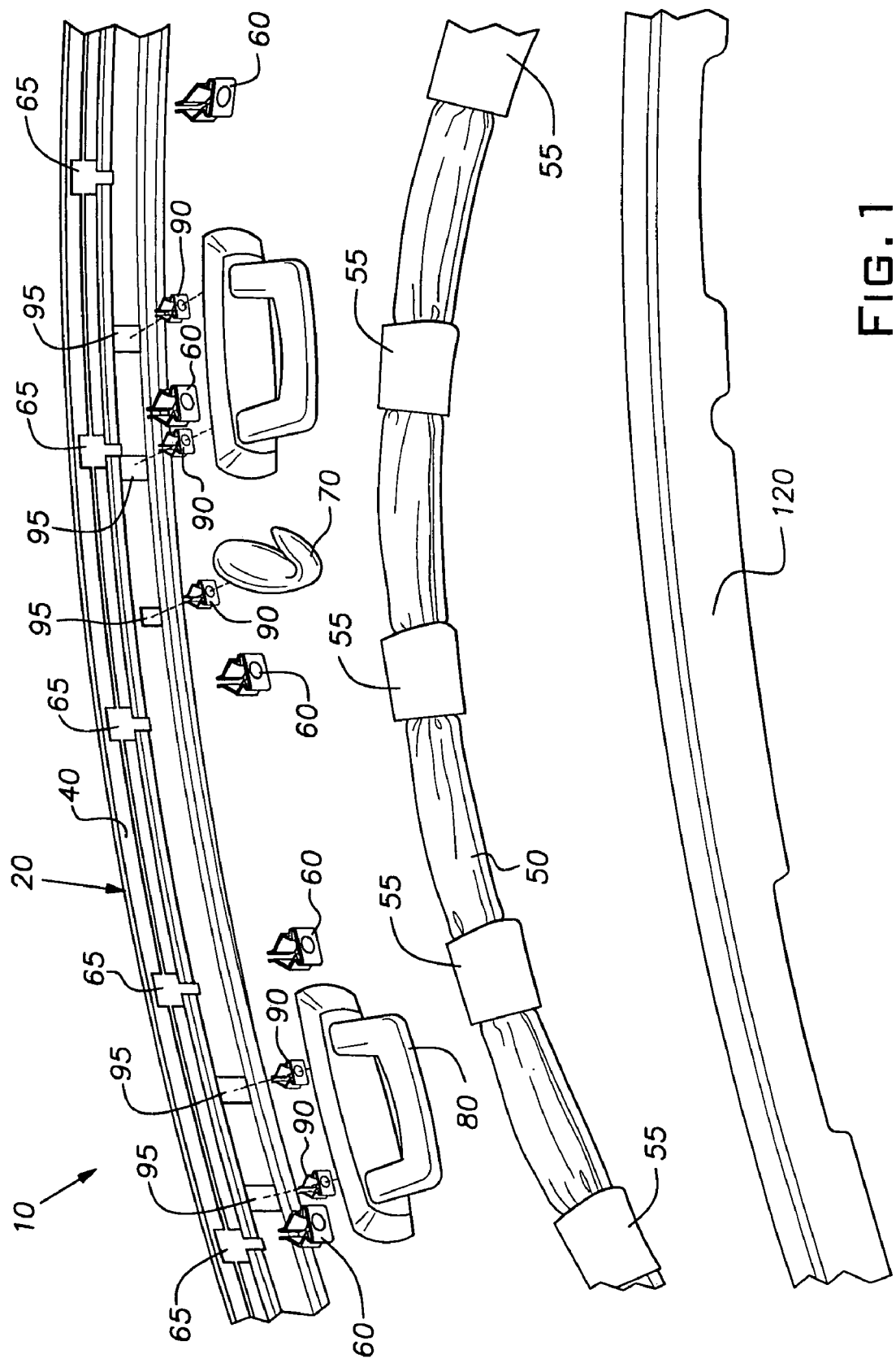
FIG. 1 illustrates an exploded view of an integrated side curtain airbag assembly.
Figure 2:
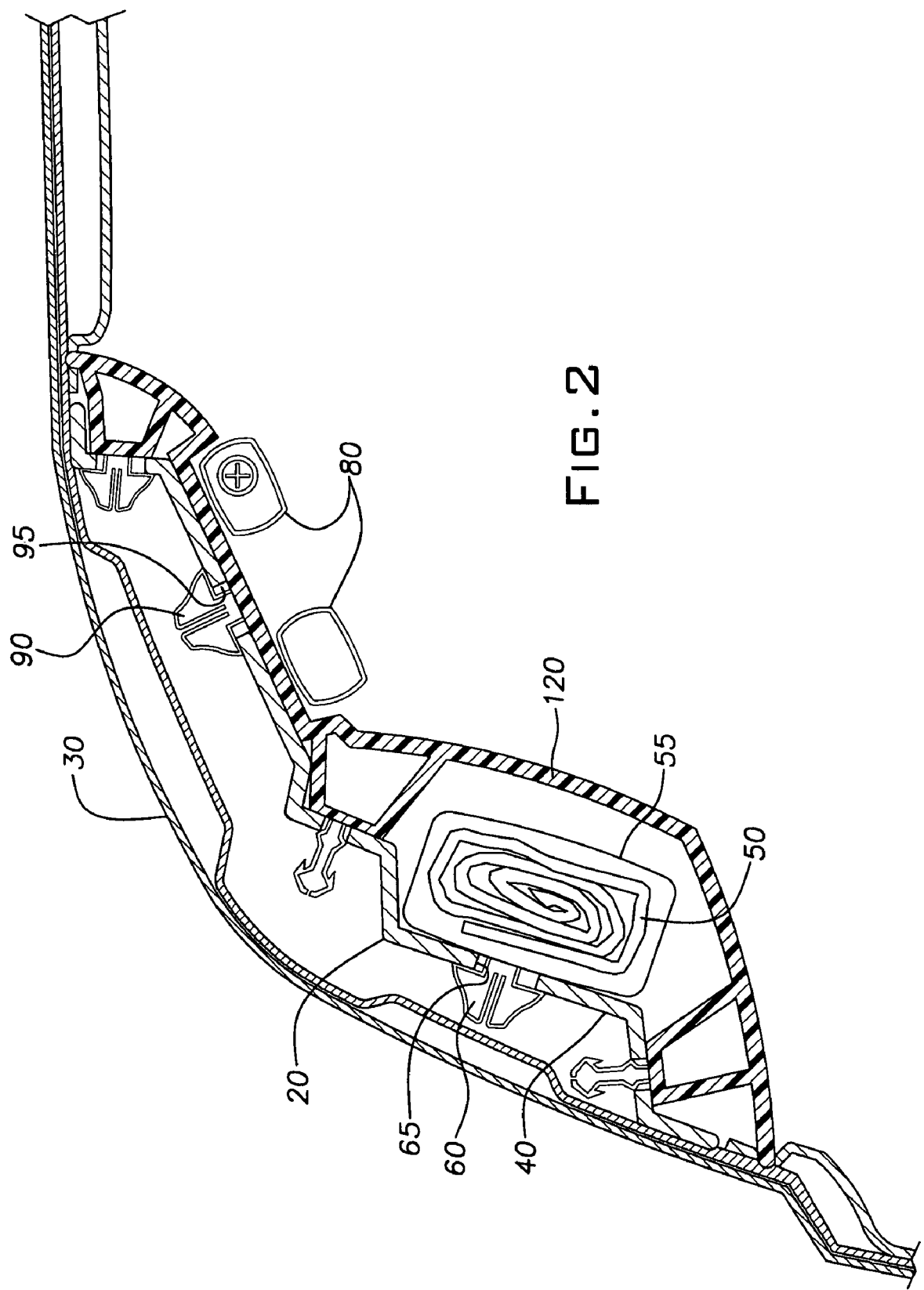
FIG. 2 illustrates a cross-sectional view of an integrated side curtain airbag assembly.

Referring now to FIGS. 1 and 2, a side curtain airbag assembly 10 is shown. The assembly 10 includes a support structure 20 which may be single, unitary component. The support structure 20 may be shaped and sized to connect to a portion of a roof rail 30 of a vehicle. The support structure 20 may be securable to one or more components to form an integrated modular unit which may be secured to the roof rail 30 of a vehicle as a single, unitary component.

The support structure 20 may be constructed from any suitably rigid material, including but not limited to metal, high-strength polymer, composite material, or the like. The support structure 20 may consist of a single, unitary body capable of receiving numerous components of the assembly 10. In an embodiment, the support structure 20 may correspond in size and shape to the roof rail 30 of the vehicle. The support structure 20 may have a longitudinal profile similar to that of the roof rail 30 such that the support structure 20 may be positioned generally flush along the roof rail 30 when secured thereto. The support structure 20 may improve the rigidity and provide strength and support for the roof rail 30.

An airbag 50 may be secured to the support structure 20. The airbag 50 may be secured to the support structure in an uninflated (deflated) or unactuated position. The airbag 50 may be actuated or inflated, such as by being filled with air or other fluid to prevent injury to the occupant of the vehicle. In a preferred embodiment, the support structure 20 may remain secured to the support structure 20 during actuation or inflation.

The support structure 20 may include a track 40 for receiving an airbag 50. For example, the track 40 may be a recess, groove-like structure or indentation in the support structure 20 for receiving, aligning and positioned the airbag 50 to the support structure 20. The track 40 may have sidewall defining a recess for receiving the airbag 50. In another embodiment, shown in FIG. 2, the support structure 20 have a shape, such as a bent or recessed shape adjacent the location where the airbag 50 connects to the support structure 20. In such an embodiment, the airbag 50 may be connected to the support structure 20 and, in turn, the roof rail 30 of the vehicle while maintaining a relatively minimal distance within the vehicle.

The airbag 50 may be maintained in a compact, unactuated (e.g. uninflated) condition by one or more bands 55. For example, the bands 55 may be wrapped about the airbag 50 and spaced at intervals along the length of the airbag 50. The bands 50 may be made of any suitable material as will be appreciated by one of ordinary skill in the art. The bands 50 may be tear, break, or disconnect from the airbag 50 upon inflation of the airbag 50. In an embodiment, the bands 50 may have a weakened portion for rupturing or otherwise disconnecting from the airbag 50 at a predetermined pressure as the airbag 50 is inflated.

Each band 55 may have an attachment portion 60 connected thereto. For example, the attachment portion 60 may consist of a clip structure capable of snap-fitting within an aperture, such as an aperture 65 of the support structure 20. In an embodiment, the attachment portion 60 may be integrally formed with the band 55. The attachment portion 60 of the band may secure the airbag to the support structure 20 and secure the support structure 20 to the roof rail 30. In such an embodiment, the attachment portion 60 may have a size permitting extension through the aperture 65 of the support structure 20 and into the roof rail 30. While the attachment portion 60 may be a snap-fit clip, one of ordinary skill in the art will appreciate that the attachment portion is not limited to a snap-fit clip and may have any other structure to permit connection of the band 55 to the support structure 20 and/or the roof rail 30, such as but not limited to screws, rivets, adhesive, spot welding, press-fitting or the like.

The bands 55 are operable to maintain the airbag 50 in the unactuated position at the track 40 until the airbag 50 receives gas from an inflator wherein the bands 55 release the airbag 50 thereby allowing it to inflate and expand down along the window 100 to protect the occupant's head and torso during a collision. The attachment portion 60 of the band 55 may permit the band 55 to maintain connection to the roof rail 30 and/or the support structure 20 upon inflation of the airbag 50.

The assembly 10 may include one or more coat hooks 70 and/or one or more grab handles 80 secured to the support structure 20. The coat hooks 70 and the grab handles 80 may have one or more attachment portion 90 connected thereto. The attachment portion 90 may be integrally formed with the coat hook 70 and/or the grab handle 80 or may be otherwise attached to or secured to the coat hook 70 or the grab handle 80. In an embodiment, the attachment portion 90 may be a clip-like structure designed to snap into an aperture, such as apertures 95 in the support structure 20.

The attachment portion 90 may be received by the apertures 95 corresponding to a predetermined location to secure the grab handle 80 and/or the coat hook 70 to the support structure 20. The attachment portion 90 may secure the grab handle 80 and/or the coat hook 70 to the support structure 20 and secure the support structure 20 to the roof rail 40. For example, the attachment portion 90 may extend through the apertures 95 of the support structure 20 and secure to the roof rail 40 of the vehicle. The attachment portion 90 of the coat hooks 70 and grab handles 80 is not limited to snap-fit clip structure and may be secured to the support structure 20 and/or the roof rail 30 in any manner that will be appreciated by a person of ordinary skill in the art, such as but not limited to bolts, screws, rivets, adhesive, spot welding, or other.

As will now be appreciated, numerous other systems and components may also be incorporated in the assembly 10 and be mounted to the support structure 20. For example, the assembly 10 may also include wiring harnesses for overhead lighting systems, wiring harnesses for entertainment systems, an airbag inflator, or other components. Furthermore, a beauty panel (or cover) 120 may be mounted to the support structure 20 and may be included in the assembly 10. The support structure 20 may include apertures for receiving clips, or other similar fasteners, from a beauty panel 120 after the assembly 10 has been secured to the roof rail 30.

Figure 3:
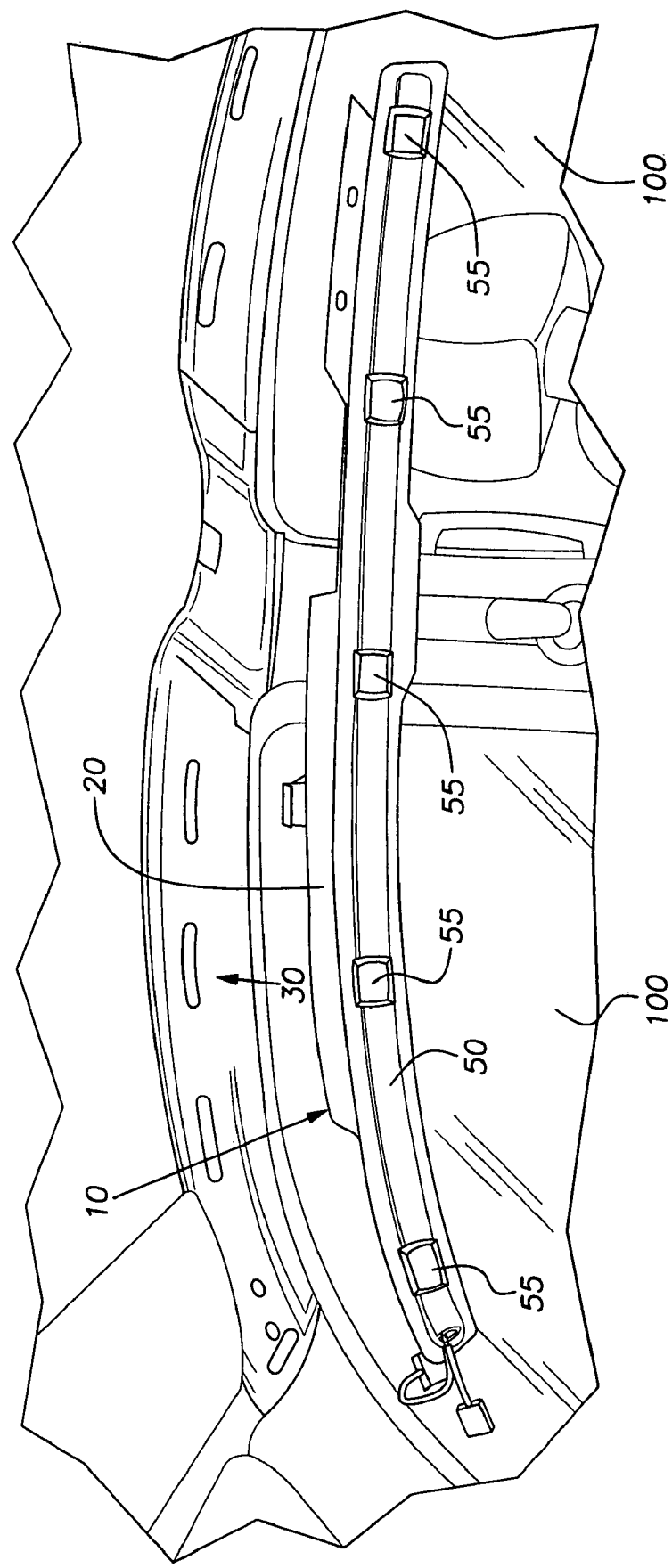
FIG. 3 illustrates a first environmental view of an integrated side curtain airbag assembly where the airbag assembly is not installed in the vehicle.
Figure 4:
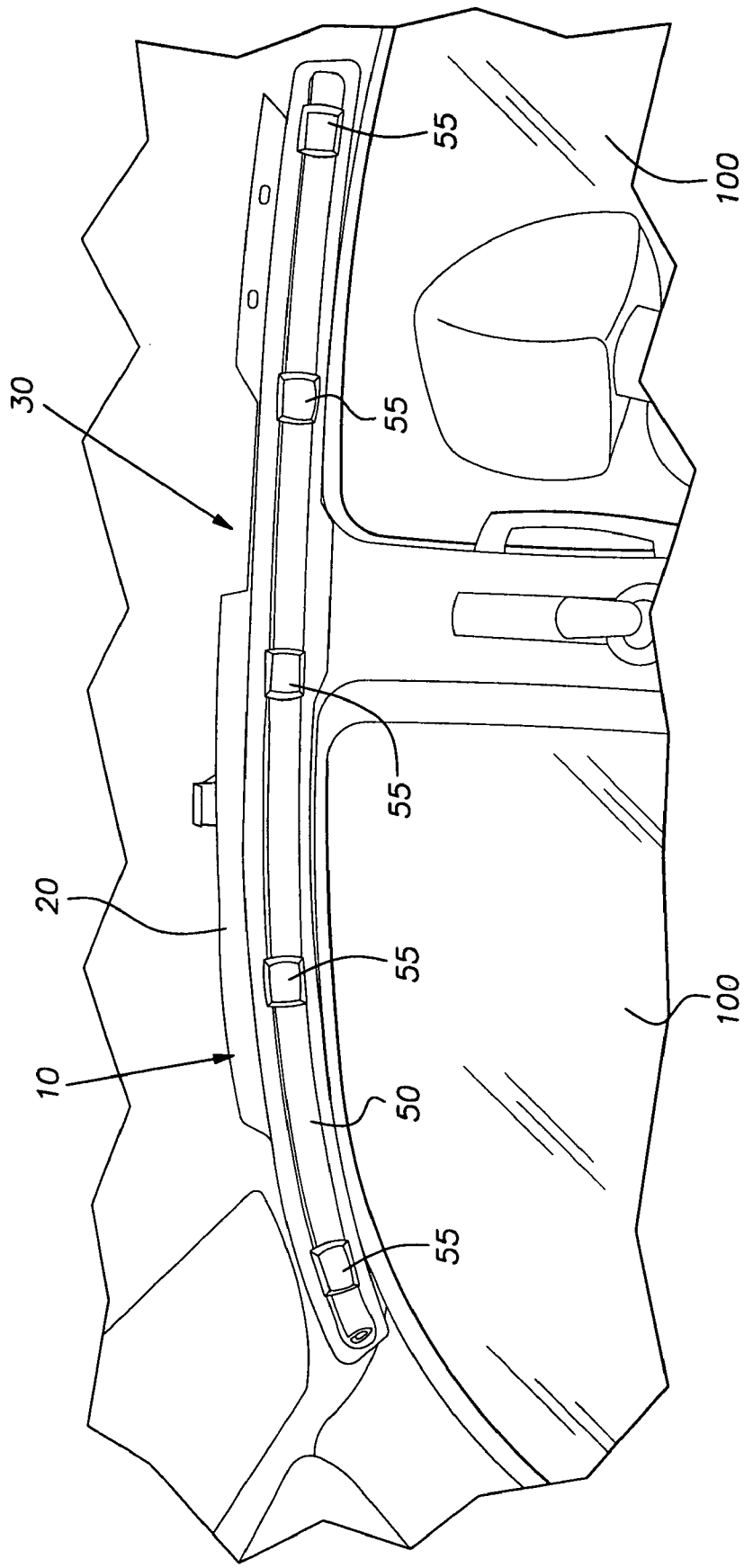
FIG. 4 illustrates a second environmental view of an integrated side curtain airbag assembly where the airbag assembly is installed in the vehicle.

In the preferred embodiment, the airbag 50, one or more of the coat hooks 70 and/or one or more of the grab handles 80 are mounted to the support structure 20 to form the assembly 10. The airbag 50, the coat hooks 70 and the grab handles 80 may have the attachment portions 60, 90 to permit connection, such as a snap-fit connection to the support structure 20 and/or the roof rail 30 of the vehicle. Optionally, the beauty panel (or cover) 120 may be secured to the support structure 20 and form part of the assembly 10. FIGS. 3 and 4 illustrate the assembly 10 securable to the roof rail 30 of the vehicle as a single component. As a result, the assembly 10 improves installation of the airbag 50 by providing a single assembly that is securable to the roof rail 30 of the vehicle. The airbag 50 may then be connected to its associated controller and/or inflator. Likewise, any wiring harness that is part of the assembly 10 may be connected to its associated components. Once the assembly 10 has been fully mounted to the roof rail 30, the beauty panel 120 may be coupled to the support structure 20 and about the entire assembly 10.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. An airbag assembly for a vehicle comprising:
   a generally rigid support structure mountable directly to a roof rail of the vehicle, the support structure having an integrally formed single unitary body;
   a track integrally formed in the body of the support structure;
   an airbag secured to the body of the support structure, wherein the track positions the airbag to secure the airbag to the body of the support structure;
   a grab handle or a coat hook secured to the body of the support structure; and
   at least one band circumscribing the airbag generally maintaining the airbag in an unactuated position.

2. The airbag assembly of claim 1 wherein the support structure snap-fits into a roof rail of the vehicle.

3. The airbag assembly of claim 2 wherein the grab handle and the coat hook are snap fit to the body of the support structure.

4. The airbag assembly of claim 1 further comprising:
   a plurality of bands circumscribing and positioned about the airbag maintaining the airbag in the unactuated position.

5. The airbag assembly of claim 4 wherein the bands are snap-fit onto the support structure.

6. The airbag assembly of claim 5 wherein the bands have an attachment portion for securing the airbag to the support structure.

7. The airbag assembly of claim 6 wherein the attachment portion secures the airbag to the support structure and secures the support structure to the roof rail of the vehicle.

8. The airbag assembly of claim 7 further comprising:
one or more apertures capable of receiving the attachment portion of the band.

9. The airbag assembly of claim 1 wherein the support structure having the airbag and the grab handle or the coat hook is snap-fit into the vehicle as a single component.

10. An airbag assembly securable to a vehicle comprising:
a rigid support structure having an integrally formed single unitary body attachable to a roof rail of the vehicle, wherein the support structure provides support to the roof rail;
an airbag having an attachment portion secured to the support structure;
a track integrally formed within the support structure, wherein the track receives at least a portion of the airbag;
a coat hook securable to the support structure;
a grab handle securable to the support structure, wherein the support structure, the airbag, the coat hook and the grab handle are securable as a single component to the vehicle.

11. The airbag assembly of claim 10 wherein the attachment portion of the airbag includes a snap-fit clip portion securable to a first aperture of the support structure.

12. The airbag assembly of claim 11 wherein the coat hook has an attachment portion securable to a second aperture of the support structure.

13. The airbag assembly of claim 12 wherein the grab handle has an attachment portion securable to a third aperture of the support structure.

14. The airbag assembly of claim 13 wherein the coat hook and the grab handle snap-fit to the support structure.

15. The airbag assembly of claim 13 wherein the attachment portion of the grab handle is securable to the vehicle and the support structure.

16. The airbag assembly of claim 12 wherein the attachment portion of the coat hook is securable to the vehicle and the support structure.

17. A method for securing an integrated side curtain airbag assembly to a roof panel of a vehicle comprising the steps of:
providing a generally rigid support structure having a single unitary body and a plurality of apertures formed therein;
positioning an airbag within a track integrally formed within the support structure;
securing an airbag having an attachment portion to one of the apertures of the support structure;
securing a coat hook or a grab handle to another one of the apertures of the support structure; and
securing the support structure with the airbag and the coat hook or the grab handle secured to the support structure to the roof panel of the vehicle, wherein the support structure provides support to the roof panel.

18. The method of claim 17 wherein the attachment portion of the airbag is securable to the roof panel of the vehicle.

19. The method of claim 17 further comprising the step of:
securing one or more bands to the airbag to secure the airbag to the support structure, the one or more bands each having an attachment portion securable to the support structure and the roof panel of the vehicle.

* * * * *